US006981313B2

(12) United States Patent
Olejniczak et al.

(10) Patent No.: US 6,981,313 B2
(45) Date of Patent: Jan. 3, 2006

(54) APPARATUS FOR CONNECTING ELECTRIC TERMINAL TO CONNECTOR BLOCKS

(75) Inventors: Jacob M. Olejniczak, O'Fallon, MO (US); Vincent P. Fargo, St. Charles, MO (US); Kent L. White, Maryland Heights, MO (US); Paul G. Michaels, St. Louis, MO (US); William L. Riggs, Russellville, KY (US); Charles A. Peters, Bowling Green, KY (US)

(73) Assignee: Emerson Electric Co., St. Louis, MO (US)

(*) Notice: Subject to any disclaimer, the term of this patent is extended or adjusted under 35 U.S.C. 154(b) by 149 days.

(21) Appl. No.: 10/191,586

(22) Filed: Jul. 9, 2002

(65) Prior Publication Data

US 2004/0009711 A1 Jan. 15, 2004

(51) Int. Cl.
*B23P 19/00* (2006.01)
*H01R 43/00* (2006.01)

(52) U.S. Cl. .............................. 29/748; 29/739; 29/759; 29/857; 29/861; 174/84; 439/310; 439/680; 439/752

(58) Field of Classification Search ................... 29/748, 29/739, 759, 857, 861; 174/84; 439/310, 439/680, 752
See application file for complete search history.

(56) References Cited

U.S. PATENT DOCUMENTS

| | | | | |
|---|---|---|---|---|
| 3,605,078 A | | 9/1971 | Paullus | |
| 3,764,960 A | | 10/1973 | Heimbrock | |
| 3,842,396 A | | 10/1974 | Olsson | |
| 3,963,296 A | | 6/1976 | Glover et al. | |
| 4,373,261 A | | 2/1983 | Long, Jr. | |
| 4,529,260 A | | 7/1985 | Smith | |
| 4,566,747 A | | 1/1986 | Peers | |
| 4,921,435 A | | 5/1990 | Kane et al. | |
| 5,131,858 A | | 7/1992 | Heimbrock | |
| 5,467,023 A | * | 11/1995 | Takeyama | 324/754 |
| 5,490,798 A | * | 2/1996 | Murakami et al. | 439/310 |
| 5,584,716 A | | 12/1996 | Bergman | |
| 5,586,900 A | * | 12/1996 | Yagi et al. | 439/310 |
| 5,718,603 A | * | 2/1998 | Watanabe et al. | 439/489 |
| 6,042,410 A | * | 3/2000 | Watanabe | 439/269.1 |
| 6,372,993 B1 | | 4/2002 | Eckels et al. | |
| D473,847 S | | 4/2003 | Nakayama | |
| 2004/0041483 A1 | | 3/2004 | Gary et al. | |

* cited by examiner

*Primary Examiner*—Carl J. Arbes
*Assistant Examiner*—Tim Phan
(74) *Attorney, Agent, or Firm*—Thompson Coburn, LLP

(57) ABSTRACT

An electric terminal connector block is provided with oblong tool openings that communicate with interior channels of the connector block and with openings in the motor wiring electric terminals positioned in each channel of the connector block. The oblong shapes of the tool openings enable insertion of tool pins through the tool openings and openings of the electric terminals and movement of the tool pins along the lengths of the oblong tool openings whereby the tool pins engage with the electric terminals and move the terminals relative to the connector block to insure that the terminals are locked in place in the connector block. In addition, the tooling used with the connector block is operated according to a method that insures that the terminals of the motor winding are moved to a position relative to the connector block where the terminals are locked in place. The tooling also provides conductor bars of a surge testing device that are connected to the electric terminals of the connector block as the terminals are properly positioned in the connector block.

23 Claims, 8 Drawing Sheets

APPARATUS FOR CONNECTING ELECTRIC TERMINAL TO CONNECTOR BLOCKS

BACKGROUND OF THE INVENTION (1) Field of the Invention

The present invention pertains to an electric terminal connector block that receives a plurality of electric terminals for the wiring of an electric motor and provides means for ensuring that the electric terminals are securely received in the connector block. In addition, the present invention provides tooling that is used with the connector block of the invention that moves each of the terminals of the motor wiring to a position relative to the connector block where the terminals are locked in the block. The tooling also provides a means of connecting the connector block and the attached electric terminals to a surge tester for testing the electrical wiring of the electric motor.

(2) Description of the Related Art

Electric motors that are manufactured for use in devices such as home appliances are manufactured in such a way that the purchaser of the manufactured electric motor, for example the appliance manufacturer, can easily assemble the electric motor and connect the wiring of the motor to the wiring of the appliance for proper operation of the appliance. To facilitate the appliance manufacturer's assembly of the electric motors into their appliances on the assembly line, electric motor manufacturers typically provide their motors to the appliance manufacturers with the wiring of the motor connected to a cluster block or connector block that can easily be connected with a receptor of the appliance to interconnect the wiring of the electric motor with the wiring of the appliance.

A prior art connector block is shown in FIGS. 1A through 1E. The connector block is typically constructed of an electrically insulating material, for example some type of plastic. The exterior configuration of the connector block 10 is designed so that the block can be easily connected to the electrical receptor of the appliance to which the electric motor is assembled. In the particular example of the prior art connector block 10 shown in FIGS. 1A through 1E, FIG. 1A shows the top surface 12 of the connector block, FIG. 1B shows one side surface 14 of the connector block with the opposite side surface being a mirror image, FIG. 1C shows the bottom surface 16 of the connector block, FIG. 1D shows the distal end surface 18 of the connector block and FIG. 1E shows the proximal end surface 20 of the connector block. The proximal end surface 20 of the connector block receives the plurality of electric terminals on the wiring of the electric motor, as will be explained.

A plurality of elongate channels, equal in number to the number of wires and electric terminals of the electric motor, extend through the interior of the connector block from the proximal end surface 20 to the distal end surface 18. In the example shown in the drawing figures there are three interior channels 22. The interior channels 22 extend through the connector block from channel openings 24 in the proximal end surface 20 of the connector block to conductor openings 26 in the opposite, distal end surface 18 of the connector block. Each of the channel openings receives an electric terminal and a portion of the motor wiring connected to the terminal. A set of circular tool openings 28 is provided through the connector block bottom surface 16. The tool openings 28 provide access to the connector block interior channels 22 and are used to determine the position of an electric terminal of the electric motor wiring in each interior channel 22 of the connector block, as will be explained. The tool openings 28 also receive electrical conductors through the openings when the connector block 10 is attached to the receptor of the appliance to which the motor is assembled to establish the electric connection between the wiring of the appliance and the wiring of the electric motor.

FIGS. 2A through 2C show a prior art electric terminal 32 connected to the end of a portion of a motor wire 34. The electric terminal 32 is typically stamped from a thin sheet of conductive metal and then is bent in the configuration shown in FIGS. 2A through 2C. A narrow stem 36 formed at one end of the terminal is bent around and crimped to an end of the motor wire 34 from which the wire insulation has been removed. At the end of the stem 36 the terminal is formed with a pair of side flanges 38 that are bent over each other with a generally flat base 40 of the terminal positioned between the flanges. A rectangular opening 42 is provided through the base of the terminal. A notch 44 is formed in each of the side flanges 38 separating a locking tab 46 from the remainder of the flange. Each of the locking tabs 46 are bent slightly outwardly away from each other.

In assembling each of the electric terminals 32 and its connected motor wire 34 into the connector block 10, the terminal 32 would typically be manually positioned adjacent the connector block proximal end surface 20. The electric terminal base 40 is positioned at the bottom of one of the connector block interior channels 22 as viewed in FIG. 1E with the terminal flanges 38 and locking tabs 46 projecting upwardly. Each of the terminals 32 would then be inserted manually through the connector block interior channel 22 toward the connector block distal end surface 28. A pair of opposed protrusions (not shown) are provided inside each connector block interior channel 22 adjacent the distal end surface 18 of the connector block. The terminals 32 would be inserted to the extent that the locking tabs 46 would pass over the protrusions and engage against opposite sides of the protrusions from the connector block proximal end surface 20, thereby locking the electric terminal 32 and its connected motor wire 34 in the connector block 10. With the electric terminal 32 locked in the connector block 10, the base opening 42 of the electric terminal is aligned with one of the tool openings 28 of the connector block. Each electric terminal 32 is also positioned adjacent one of the conductor openings 26 in the distal end surface of the connector block. To test the motor wiring, conductive posts of a surge tester would be inserted through the conductor openings 26 to establish electrical contact with the electric terminals. The motor windings would then be tested by the surge tester to ensure proper operation of the motor.

To ensure that each of the electric terminals 32 was properly positioned in one of the interior channels 22 of the connector block, a tool was used on the assembly line to determine the positions of the terminals in the connector block channels. The tool (not shown) typically comprised one or more pins that would be manually inserted into the tool openings 28 on the bottom surface 16 of the connector block to ensure that each terminal base opening 42 was aligned with its associated tool opening. The alignment of the terminal base opening 42 with the tool opening 28 was considered to be a sufficient check to ensure that the electric terminal 32 had been fully inserted into an interior channel 22 of the connector block so that the terminal locking tabs 46 were engaged with the interior channel protrusions. However, it has since been determined that the alignment of the electric terminal base opening 42 with the tool opening 28 of the connector block is not a reliable test of the proper positioning of the motor wiring electric terminals 32 in the connector block interior channels 22. With the prior art constructions of the connector block 20 and the electric terminals 32, it was possible that the tool pin could be inserted into the connector block tool opening 28 and through the base opening 42 of the electric terminal positioned in the connector block indicating that the electric terminal was properly positioned in the connector block interior channel, where the electric terminal lock tabs 46 were not properly positioned beyond the protrusions in the connector block interior channel 22. This would result in the motor connector block passing the test to determined that the electric terminals 32 were properly inserted into the connector block interior channels 22 when the terminals were not properly positioned in the channels. This would often result in one or more of the electric terminals 32 and their connected motor wires 34 becoming removed from their respective interior channels 22 of the connector block 20 when the electric motor is being assembled by the appliance manufacturer into an appliance and the motor connector block is being connected to the appliance electrical receptor. These electric motors with the improperly positioned electric terminals would be rejected at the appliance manufacturer's assembly line causing downtime of the appliance manufacturer's assembly line while a replacement motor was obtained.

What is needed to overcome these shortcomings of the prior art connector block and electric terminals is a novel construction of a connector block and novel tooling used with the connector block that ensures that each of the electric terminals of the motor are properly positioned in the connector block interior channels.

SUMMARY OF THE INVENTION

The present invention overcomes the disadvantages associated with the prior art connector block and its assembly by providing a novel construction of a connector block and novel tooling for assembling electric terminals into the connector block according to a method that ensures that the electric terminals are properly positioned in the connector block in their locked positions.

The connector block of the invention has a construction that is substantially the same as the prior art connector block except for the configurations of the tool openings in the block. Where the prior art connector block tool openings were circular in shape, the tool openings of the connector block of the invention each have a circular shaped portion and a rectangular shaped portion. The circular shaped portion and rectangular shaped portion of each of the connector block tool openings gives the tool openings oblong configurations that extend along portions of the lengths of each of the interior channels of the connector block. Thus, each of the tool openings of the connector block of the invention enables a tool pin to be inserted through the circular portion of the tool opening into one of the interior channels and also enables the tool pin to be moved relative to the connector block along a portion of the length of the interior channel through the rectangular portion of the tool opening.

A novel tool construction is also used with the connector block of the invention to ensure that the electric terminals are properly positioned and locked in the connector block interior channels. The tool includes a stationary base having a platform mounted on the base for linearly reciprocating movement of the platform along the length of the base. An actuator mechanism is connected between the base and the platform and is selectively operable to linearly reciprocate the platform on the base between the first and second positions of the platform relative to the base.

A plurality of pins project outwardly from the base and are arranged in a pattern that corresponds to the pattern of the tool openings in the connector block. Each of the platform pins have a length that enables each pin to extend through a tool opening of the connector block and through the base opening of the electric terminal positioned in the interior channel associated with the tool opening. Each pin also has a width dimension that enables the pin to move through the rectangular slot of the tool opening.

A plurality of the surge tester bars are also mounted on the base of the tool. The number of bars corresponds to the number of electric terminals mounted in the connector block. The bars extend parallel to each other on the base and project toward the platform. Each of the surge tester bars are constructed of an electrically conductive material and are connected with a conventional surge tester for an electric motor. The bars are positioned on the base where the platform will move adjacent to the bars when the platform is moved to its second position relative to the base and the platform is displaced clear of the bars when the platform is moved to its second position relative to the base.

An abutment is mounted on the base for adjustable positioning of the abutment toward and away from the platform. The abutment is also positioned on the base where the abutment will be adjacent the platform when the platform is moved to its second position and where the abutment is displaced clear of the platform when the platform is moved to its second position.

In use of the connector block and tool of the invention, the platform is in its first position on the base and the connector block is positioned on the platform with the platform pins extending through the circular portions of each of the tool openings and the electric terminal base openings of the connector and into the interior channels of the connector. The actuator of the tool is then operated causing the platform to move from its first position on the base toward its second position on the base. This causes each of the platform pins to move from the circular portion of the connector tool opening toward and through the rectangular portion of the connector tool opening. This in turn causes each of the platform pins to engage with a portion of its respective electric terminal base adjacent the base opening of the terminal. The pins push the electric terminals and the connector block toward the abutment of the base and toward the surge tester bars of the base. As the platform moves toward its second position relative to the base, each of the surge tester bars is moved through one of the conductor openings in the distal end surface of the connector block and makes electrical contact with one of the electric terminals. In addition, the movement of the platform toward its second position will cause the connector block distal end surface to come into engagement with the abutment, preventing further movement of the connector block with the platform. Continued movement of the platform and the platform pins toward the second position of the platform with the connector block now held stationary by the abutment causes the platform pins to push each electric terminal toward the distal end surface of the connector block and toward the locking protrusions in the interior channels of the connector block. This ensures that the electric terminal locking tabs come into locking engagement with the protrusions in the interior channels of the connector block, thereby securing each terminal in the connector block. The movement of the block by the platform also moves the electric terminals of the block into engagement with the surge tester bars where the electric motor can now be tested for proper operation by the surge tester.

With the locking of the electric terminals in the connector block and the surge testing of the motor completed, the platform of the tool is moved from its second position toward its first position. This disengages the surge tester bars from the connector block and positions the connector block relative to the base where the connector block can be removed from the tool by merely lifting the connector block from the platform and the platform pins.

Thus, the connector block and tooling of the invention and the method of operating the tooling ensure that the electric terminals of the motor wiring are securely locked in the connector block while also providing surge testing of the motor.

BRIEF DESCRIPTIONS OF THE DRAWING FIGURES

Further features of the invention are set forth in the following detailed description of the preferred embodiment of the invention and in the drawing figures wherein.

Figure 16:
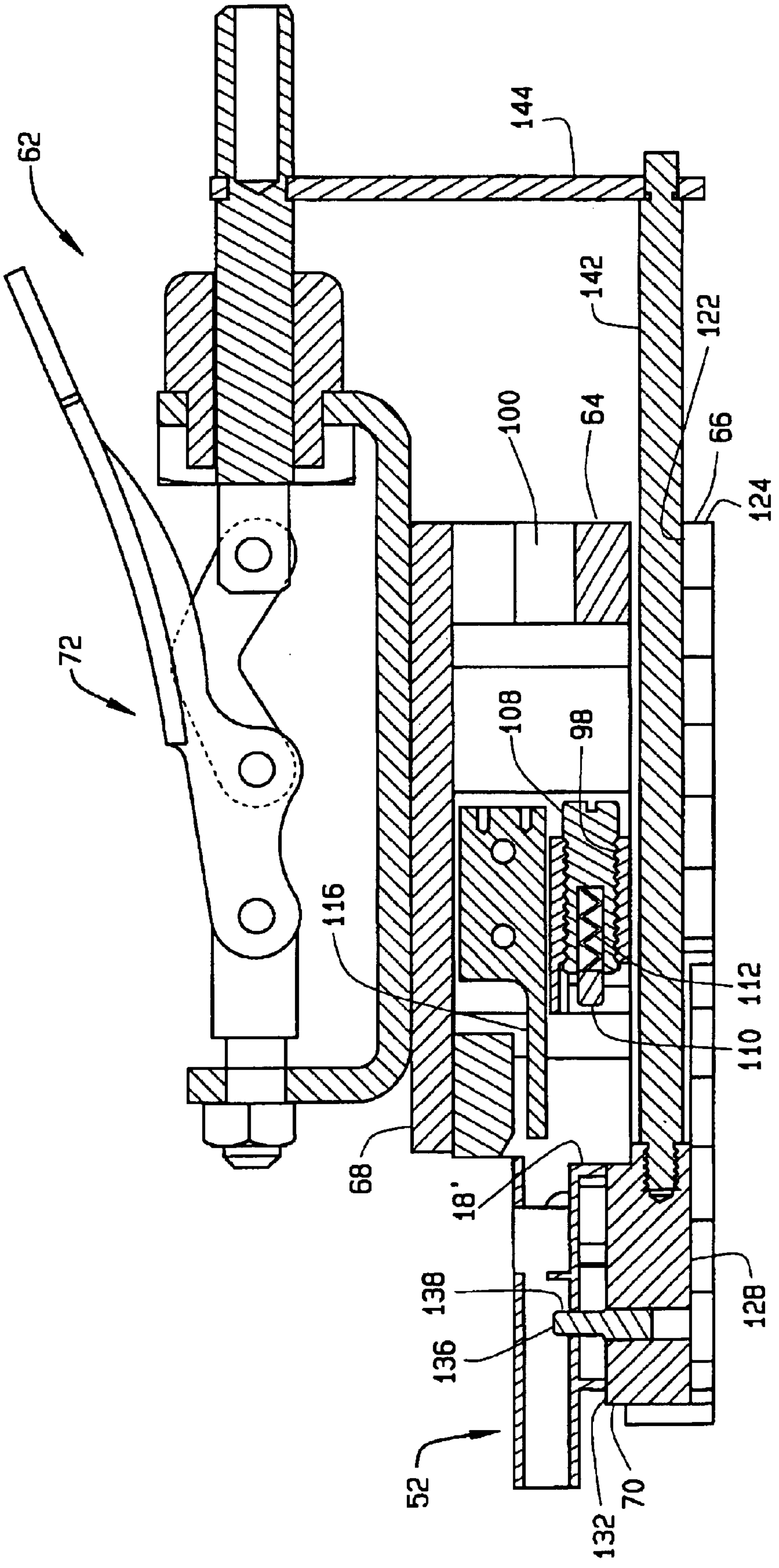
FIG. 16 shows a side sectioned view of the tool of the invention.
Figure 17:
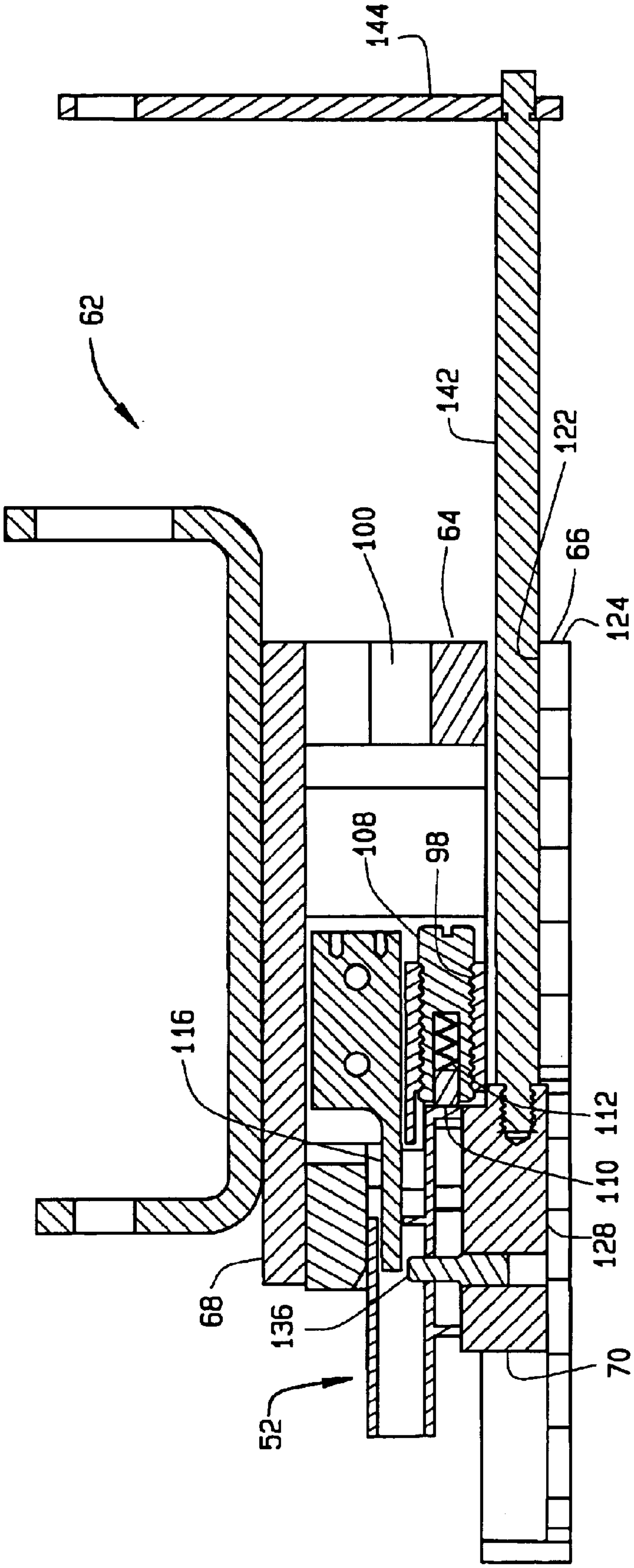
Figure 18:
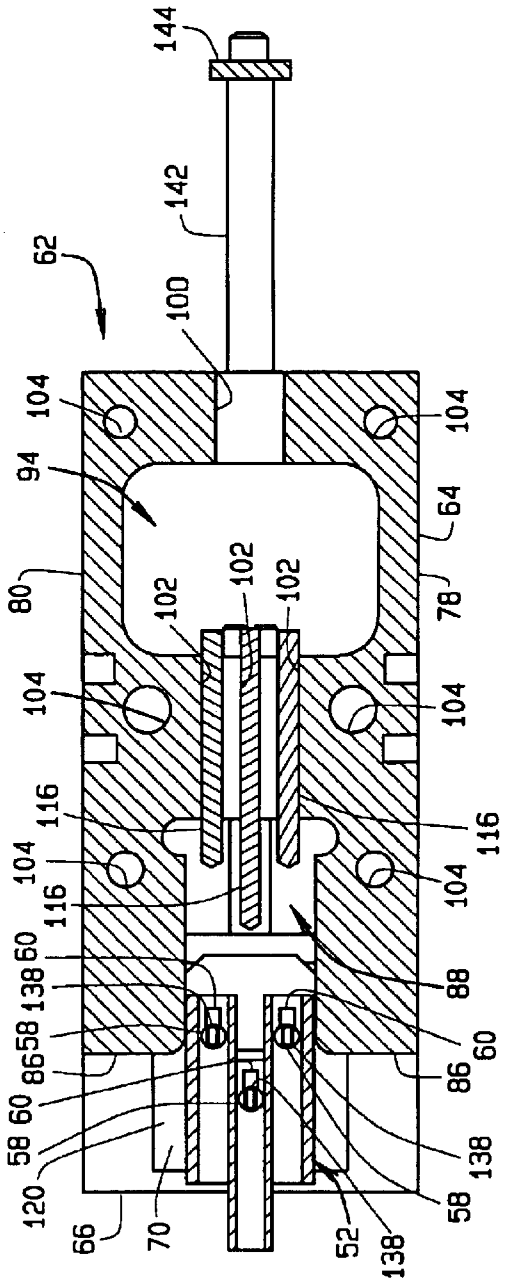
Figure 19:
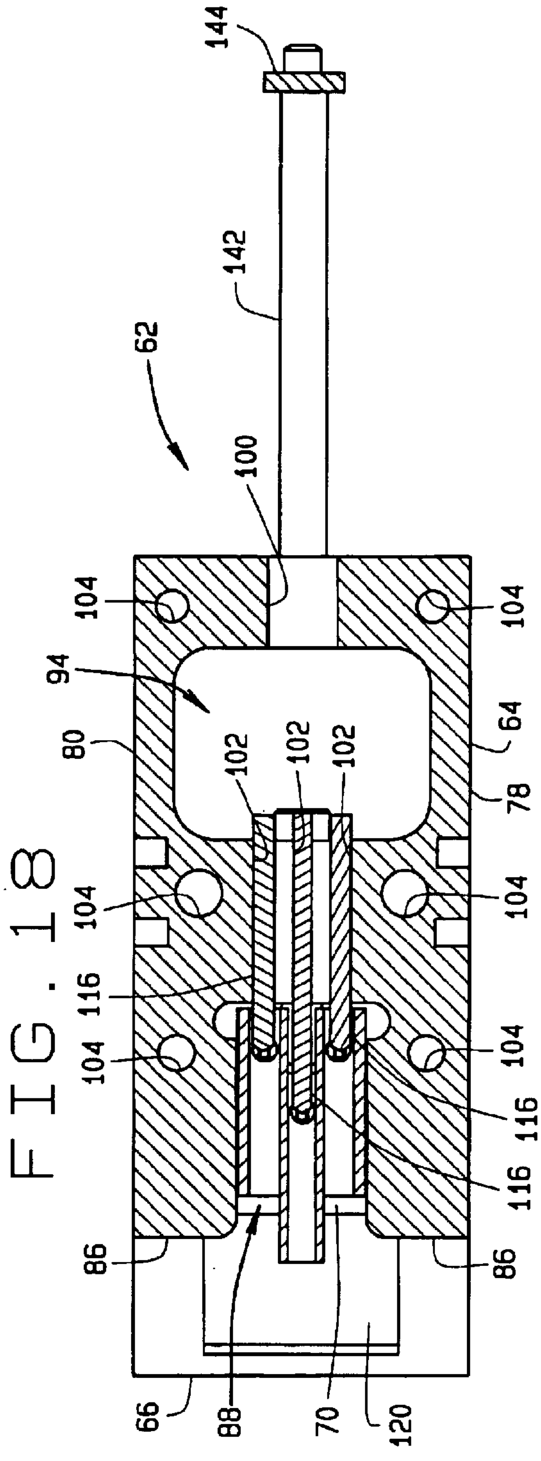
Figure 20:
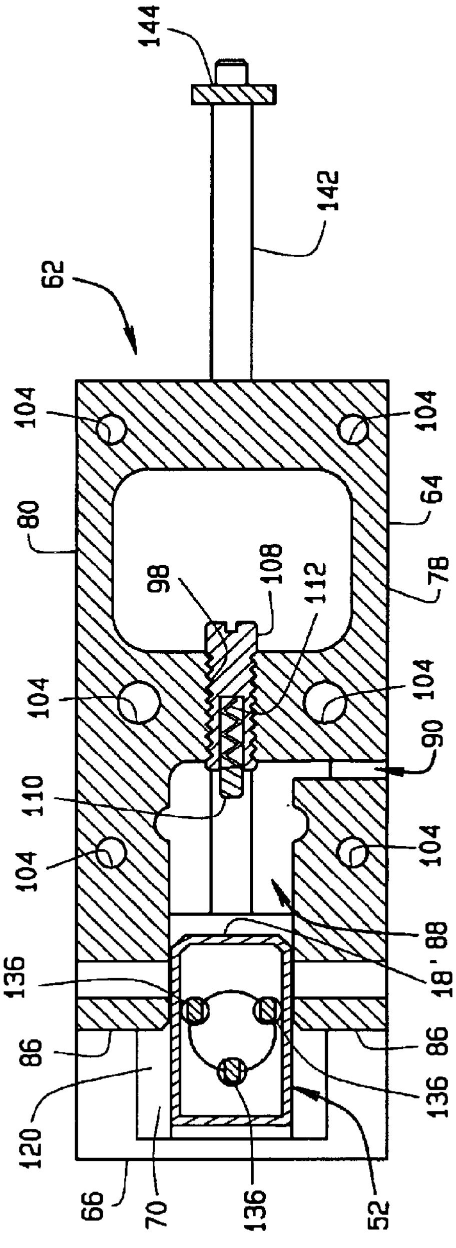
Figure 21:
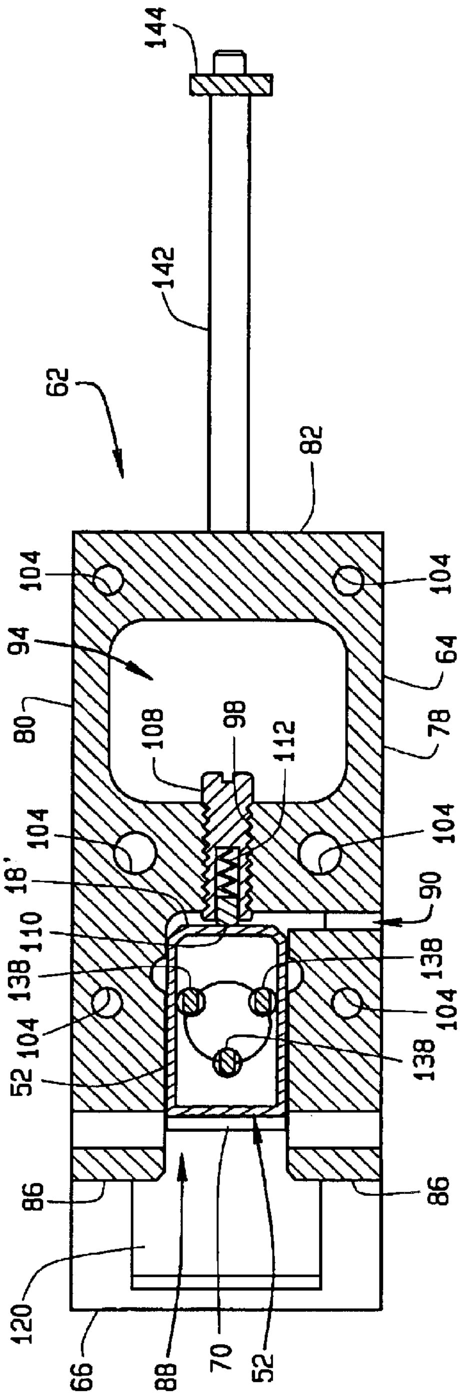

FIG. 17 also shows a sectioned side elevation view of the tool of FIG. 16;

FIG. 18 shows a sectioned plan view of the tool along the Line 18—18 of FIG. 16;

FIG. 19 shows a sectioned plan view of the tool along the Line 19—19 of FIG. 17;

FIG. 20 shows a sectioned plan view of the tool along the Line 20—20 of FIG. 16; and FIG. 21 shows a sectioned plan view of the tool along the Line 21—21 of FIG. 17.

DETAILED DESCRIPTION OF THE PREFERRED EMBODIMENT

Figure 1A:
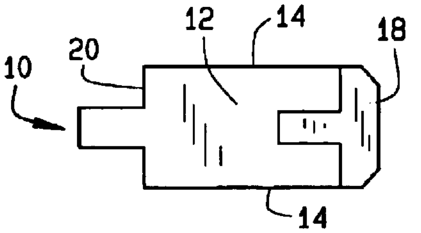
FIG. 1A PRIOR ART
FIGS. 1A through 1E show respective top, side, bottom and distal and proximal side surface views of a prior art connector block.
Figure 2A:
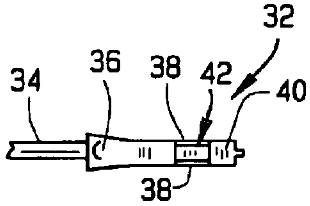
FIG. 2A PRIOR ART
FIGS. 2A through 2C show respective top, side and end views of a prior art electrical connector.
Figure 1B:
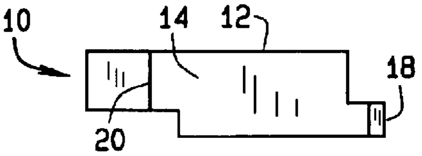
FIG. 1B PRIOR ART
Figure 2B:
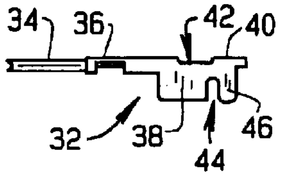
FIG. 2B PRIOR ART
Figure 1C:
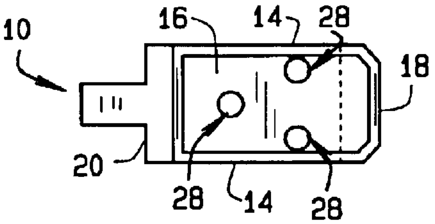
FIG. 1C PRIOR ART
Figure 2C:
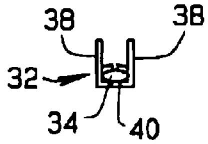
FIG. 2C PRIOR ART
Figure 1D:
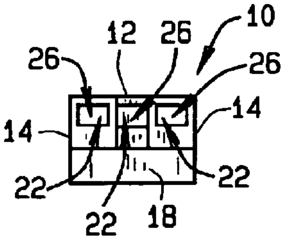
FIG. 1D PRIOR ART

The connector block 52 of the present invention has a construction that is substantially the same as that of the prior art connector block 10 described above with reference to FIGS. 1A through 1E and is used with the same electric terminals 32 of FIGS. 2A through 2C.

Figure 3:
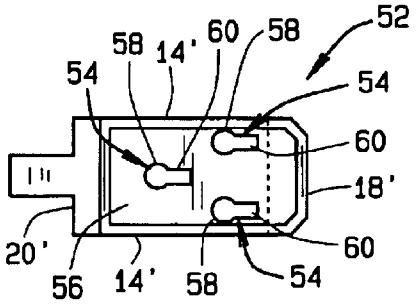
FIG. 3 shows a bottom view of the connector block of the invention.
Figure 1E:
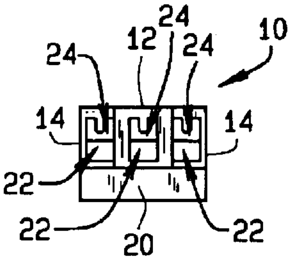
FIG. 1E PRIOR ART
Figure 8:
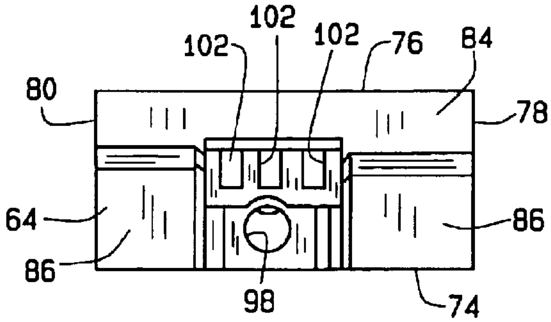
FIG. 8 shows a proximal end view of the tool base housing.
Figure 4:
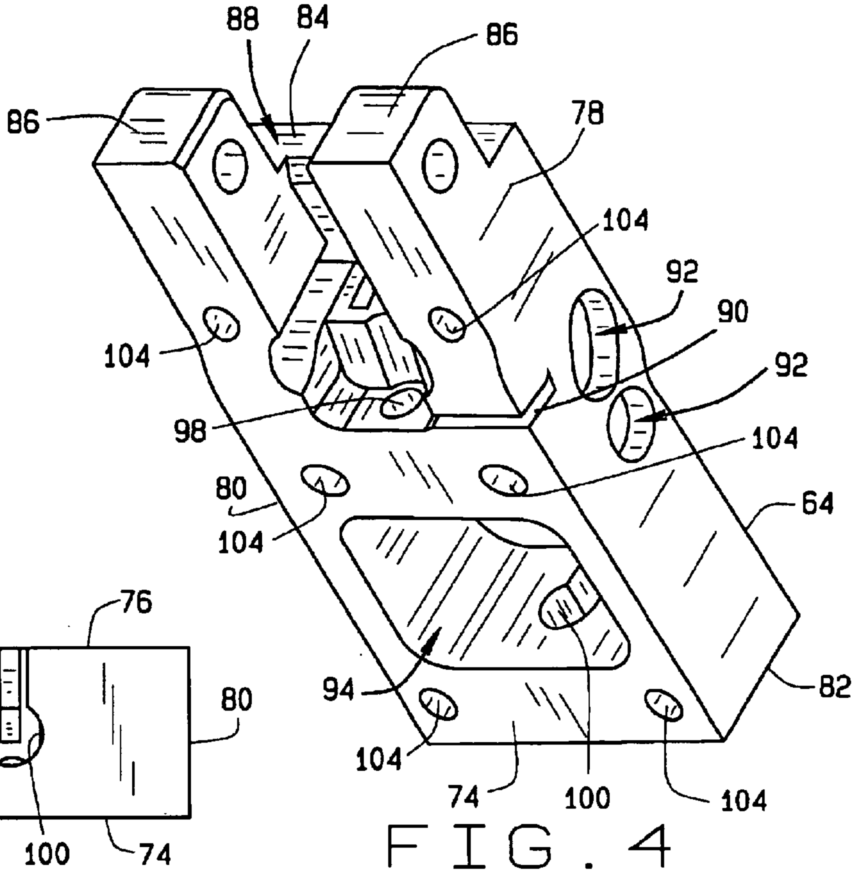
FIG. 4 shows a perspective view of a tool base housing of the invention.
Figure 9:
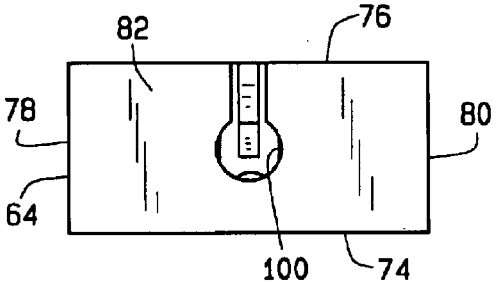
FIG. 9 shows the distal end view of the tool base housing.
Figure 5:
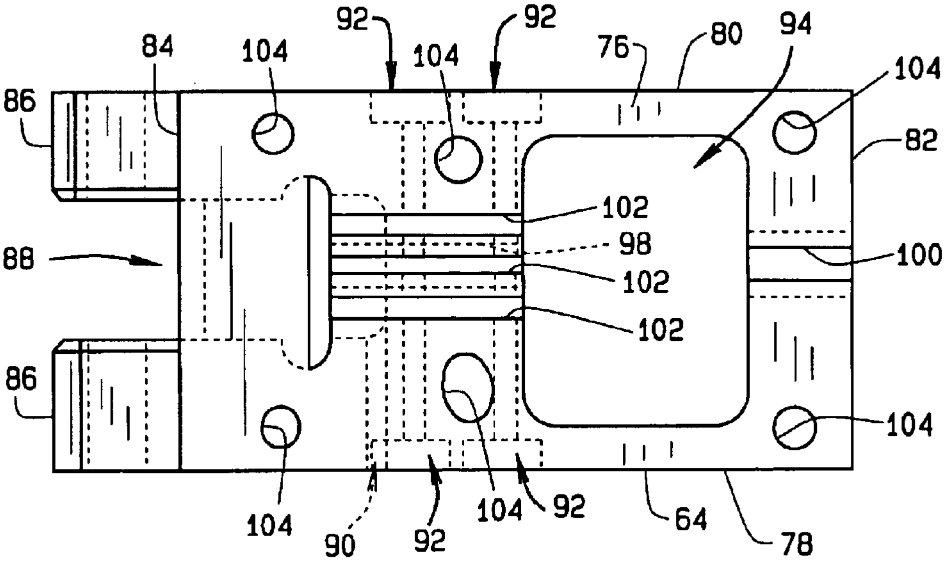
FIG. 5 shows a top plan view of the tool base housing.
Figure 6:
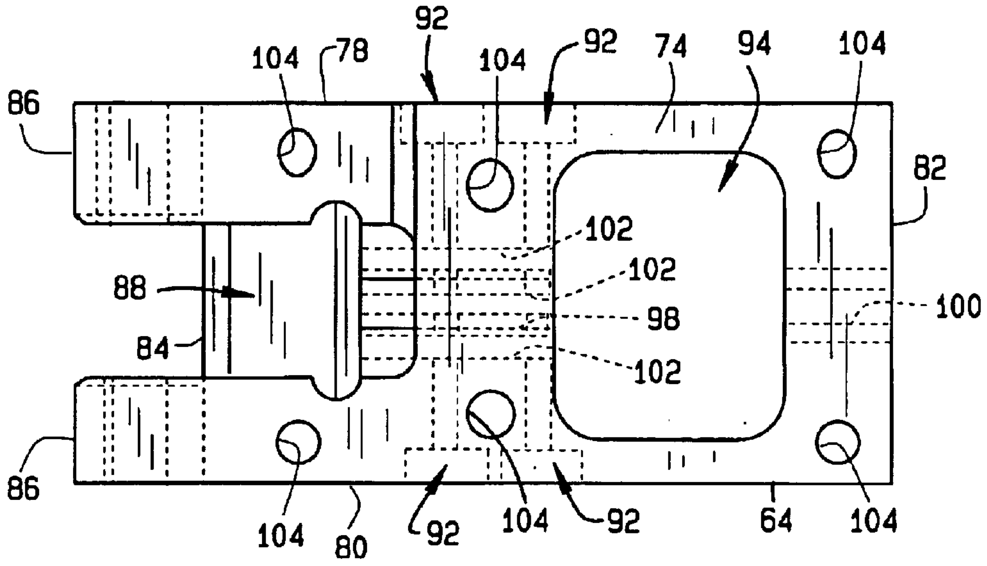
FIG. 6 shows a bottom plan view of the tool base housing.
Figure 7:
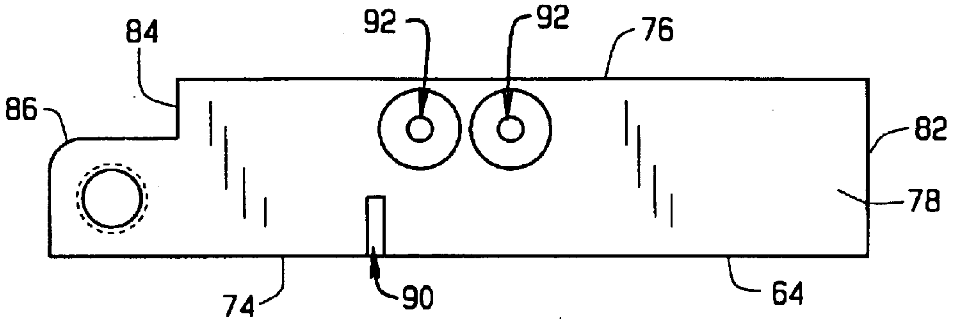
FIG. 7 shows a side elevation view of the tool base housing.
Figure 10:
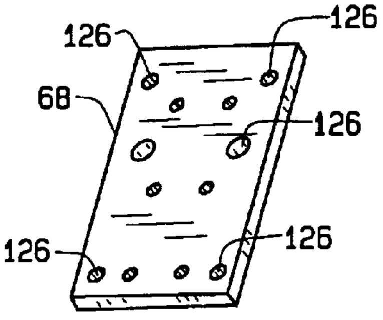
FIG. 10 shows a perspective view of the top of the tool base.
Figure 12:
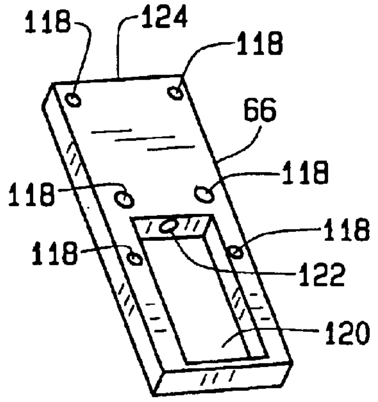
FIG. 12 shows a perspective view of the tool base bottom.
Figure 11:
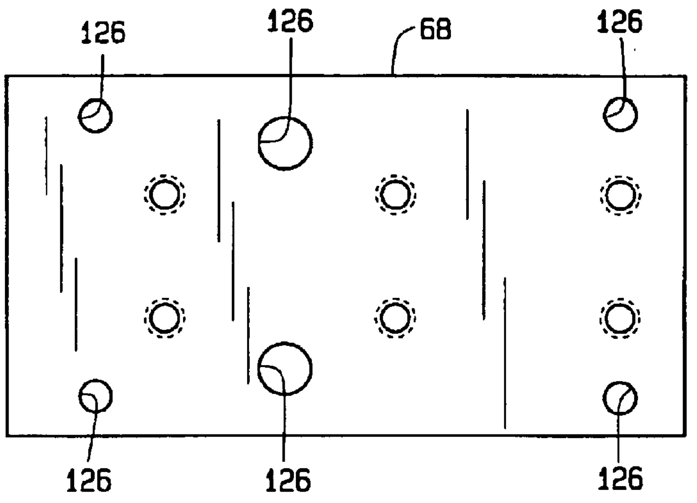
FIG. 11 shows a plan view of the tool base top.
Figure 13:
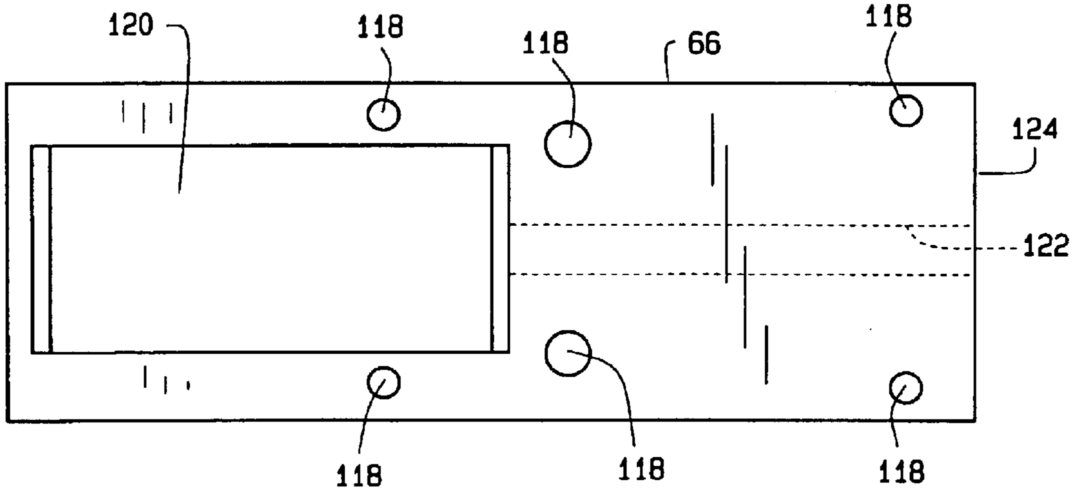
FIG. 13 shows a plan view of the tool base bottom.
Figure 14:
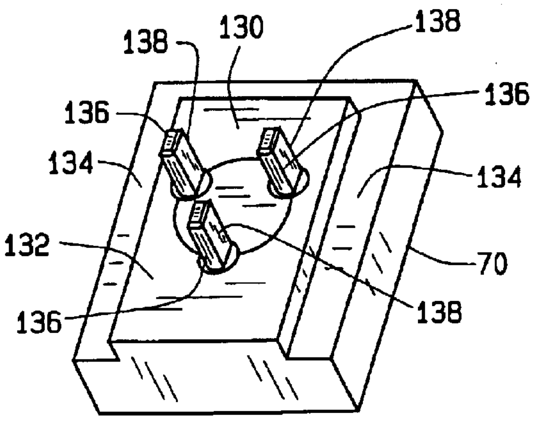
FIG. 14 shows a perspective view of the tool platform.
Figure 15:
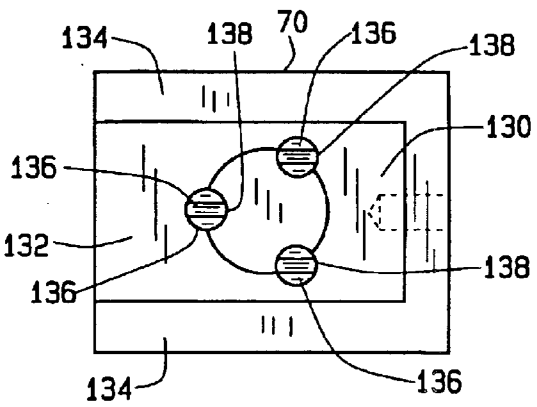
FIG. 15 shows a plan view of the tool platform.

Because many of the features of the connector block 52 of the invention are the same as those of the prior art connector block, those features of the connector block are identified by the same reference number employed in describing the prior art connector block with the reference number being followed by a prime ('). The construction of the connector block 52 differs from that of the prior art connector block 10 in the configuration of the tool openings 54 provided through the bottom surface 56 of the connector block. Because this is the only difference in the construction of the connector block 52 of the invention, only the connector block bottom surface 56 and tool openings 54 are shown in FIG. 3, with it being understood that the top surface 12', side surfaces 14', distal end surface 18' and proximal end surface 20' are constructed identically to those of the prior art connector block shown in the respective FIGS. 1A, 1B, 1D and 1E. As seen in FIG. 3, the tool openings 54 of the connector block 52 differ from those of the prior art in that the tool openings are shaped with a circular portion 58 and an extended rectangular portion 60. Both the circular portion 58 and rectangular portions 60 of the tool openings extend through the connector block bottom surface 56 and communicate with one of the interior channels 22' of the connector block. The combined circular portions 58 and rectangular portions 60 of the tool openings give them an oblong configuration with a length that extends in the first direction along portions of the lengths of each of the interior channels 22'. Each of the tool openings 54 has a length in the first direction or in a direction from the proximal end surface 20' to the distal end surface 18' of the connector block that is larger than the length in the first direction of the electric terminal base openings 42.

The tool 62 of the invention that is operated according to the method of the invention to insure that the plurality of electric terminals 32 inserted into the connector block 52 of the invention are locked in place is basically comprised of a tool base having a housing 64 with a bottom plate 66 and a top plate 68, a platform 70 mounted on the base and an actuator 72 operatively connected between the base and the platform. The component parts of the tool can be constructed of plastics, metals or a combination of both.

The tool base housing 64 is shown in FIGS. 4 through 9. The housing has a general block shape with a bottom surface 74, an opposite top surface 76, opposite side surfaces 78, 80, a rear or distal surface 82 and a front or proximal surface 84. A pair of arms 86 project outwardly from the housing front surface 84. A slot or cavity 88 is recessed into the housing front surface between the arms, defining a receptacle to receive the connector block 52, as will be explained. A viewing slot 90 extends transversely through the housing from one of the side surfaces 78 to the cavity 88. Several fastener holes 92 also extend through the housing from the opposite side surfaces 78, 80. A hollow interior void 94 is provided through the housing between its bottom surface 74 and top surface 76. An internally threaded abutment bore 98 passes through the housing from the hollow interior void 94 to the slot 88 in the front surface of the housing. An access opening 100 passes between the hollow interior void 94 and the housing rear surface 82 and is axially aligned with the abutment bore 98. A plurality of parallel slots, in the preferred embodiment three slots 102, are recessed into the housing top surface 76 and extend from the hollow interior void 94 to the cavity 88 in the front surface of the housing. A plurality of fastener holes 104 are also provided in the housing extending from the top surface 76 through the housing to the bottom surface 74.

An abutment engagement surface in the form of a spring plunger 108 is mounted in the internally threaded abutment bore 98 of the housing. The spring plunger 108 is of conventional construction and includes a housing with external threading that is adjustably screw threaded into the internally threaded abutment bore 98. A plunger having a distal engagement surface 110 is mounted in the spring plunger 108 and is biased by an internal spring 112 toward the housing receptacle slot 88. The position of the spring plunger 108 can be adjusted in the internally threaded abutment bore 98 by inserting a screw driver through the access opening 100 in the rear surface 82 of the housing and turning the spring plunger 108 in opposite directions in the internally threaded abutment bore 98. The viewing slot 90 in the housing side surface 80 is aligned with the plunger engagement surface 110 so that the extent to which the spring plunger 108 projects into the cavity in the front surface 88 of the housing can be viewed when adjusting the position of the spring plunger.

A plurality of electrically conductive surge tester posts or bars 116 are positioned in the parallel slots 102 that extend between the housing interior void 94 and the cavity 88 in the front surface of the housing. The threaded fasteners (not shown) are threaded into the side surface fastener holes 92 to engage with the surge tester bars 116 and secure the bars in the slots 102. In use, the surge tester bars 116 would be connected to a conventional surge tester used to test the windings of the motor employing the connector block 52 of the invention.

The tool base bottom plate 66 is a narrow rectangular plate having a plurality of fastener openings 118 that pass through the plate in positions that correspond to the positions of the bottom surface fastener holes 104 of the tool base housing 84. A recessed rectangular shaped cavity 120 is provided in the top surface of the bottom plate 66. The cavity 120 is positioned to coincide with the position of the cavity 88 in the front surface of the tool base housing. A bore hole 122 extends through a portion of the bottom plate from a rear surface 124 of the bottom plate to the cavity 120 of the bottom plate. The length dimension of the cavity 120 is slightly larger than the length dimension of the cavity 88 in the tool base housing front surface and the width dimension of the cavity 120 is slightly larger than the width dimension between the pair of arms 86 of the base housing.

The tool base top plate 68 is also a narrow rectangular plate that has length and width dimensions that correspond to those of the tool base housing top surface 76. It also has a plurality of fastener holes 126 that pass through the top plate in positions that correspond to the positions of the top surface fastener holes 104 of the tool base housing.

The platform 70 has a rectangular configuration with opposite bottom 128 and top 130 surfaces. The platform top surface 130 has a raised center surface area 132. A pair of shoulder surfaces 134 extend across the length of the platform 70 on opposite sides of the raised center surface 132. A plurality of pins 136 project outwardly from the raised center surface 132 of the platform. The pins 136 are equal in number to the tool openings 54 of the connector block. In addition, the pins 136 are arranged in a pattern that corresponds to the pattern of the connector block tool openings 54. Each of the pins 136 has a length that is sufficient to reach through the connector block tool openings 154 and into the base openings 42 of each electric terminal 32 positioned in an interior channel 22' of the connector block. Each of the pins 136 also has a cross-sectional configuration that enables the pins to be inserted through the connector block tool openings 54 at the circular portion 58 of the tool openings and to move through the rectangular portions 60 of the tool openings. The side surfaces 138 of the pins 136 function as engagement surfaces in the method of operating the tool of the invention, as will be explained.

In assembling the component parts of the tool 62, the platform 70 is positioned in the tool base bottom plate cavity 120 with the platform bottom surface 128 engaging in sliding contact with the bottom surface of the cavity. The platform 70 is positioned so that the pair of lower shoulder surfaces 134 extend along a first line or along a first direction of the sliding reciprocating movement of the platform 30 through the bottom plate cavity 120. The platform is also positioned so that the pair of pins 136 that are positioned side by side of the three pins are adjacent the opening of the bore 122 in the cavity 120. The tool base housing 64 is secured to the tool base bottom plate 66 over the platform 70 by inserting fasteners through the aligned fastener holes of the tool base housing 104 and the bottom plate 124. With the tool base housing 64 secured to the bottom plate 66, the housing arms 86 extend over the lowered shoulder surfaces 134 of the platform 70 securing the platform in place on the tool 62 but allowing reciprocating, sliding movement of the platform through the bottom plate cavity 120 and through the cavity 88 between the tool base housing arms 86.

The spring plunger 108 is assembled into the internally threaded abutment bore 98 of the tool base housing 64 with the plunger engagement surface 110 projecting outwardly just above the end of the bottom plate cavity 120 as shown in FIG. 16. The plurality of surge tester bars 116 are assembled into the parallel slots 102 of the tool base housing 64 with the bars projecting over the bottom plate cavity 120 also as seen in FIG. 16. The surge tester bars 116 are connected electrically to a separate surge tester device (not shown). Assembling the tool base top plate 68 to the tool base housing top surface 76 and securing it in place with fasteners inserted through the aligned fastener holes of the top plate 126 and the housing top surface 104 secures the surge tester bars 116 in the tool base housing 64.

An actuator bar 142 is inserted through the bottom plate bore 122 and is secured to the platform 70 at one end of the bar. The opposite end of the actuator bar 142 projects from the bottom plate 66 and is connected to a flange 144 that in turn is connected to the actuator 72.

The actuator 72 shown in the drawing figures is only one example of an actuator that could be employed with the tool of the device. The actuator is operable to reciprocate the actuator bar 142 between a first position of the bar relative to the tool shown in FIG. 16 and a second position of the bar relative to the tool shown in FIG. 17. Various different types of actuators, for example pneumatic or servo actuators, could be employed with the tool of the invention. Thus, the manually operated actuator shown in FIG. 16 is only one example of an actuator that may be employed with the invention, and because other types of actuators may be employed, the actuator is not shown in FIG. 17 or the other drawing figures.

In use of the connector block 52 and the tool 62 of the invention, the actuator 72 is first operated so that the platform 70 is in its first position relative to the tool base 64 shown in FIGS. 16, 18 and 20. The connector block 52, with a plurality of electric terminals 32 having been inserted into the block's interior channels 22', is then positioned on the platform 70. In this illustrated environment the connector block 52 receives three electric terminals 32 and their connected wires 34. The block 52 is positioned on the platform 70 with the platform pins 136 extending through each of the connector block tool openings 54 and through the base openings 42 of the electric terminals 32 positioned in the interior channels 22' of the connector block.

The actuator 72 of the tool is then operated, causing the platform 70 to move from its first position shown in FIGS. 16, 18 and 20, toward its second position relative to the tool base housing 64 shown in FIGS. 17, 19 and 21. As the platform 70 moves through the cavity 120 of the tool base bottom plate, the platform pins 136 move from the circular portions 58 of the tool openings toward the rectangular portions 60 of the tool openings. This in turn causes each of the platform pin side engagement surfaces 138 to come into engagement with a portion of its electric terminal base 40 adjacent the base opening 42 of the terminal. This engagement of the pins 136 with the electric terminal bases 40 causes the connector block 52 containing the electric terminals to move with the platform 70 toward the abutment engagement surface of the spring plunger 108 and toward the plurality of surge tester bars 116.

As the platform is moved toward its second position relative to the tool base housing by the actuator, each of the surge tester bars 116 is moved through one of the conductor openings 26' of the connector block 52 and makes electrical contact with one of the electric terminals 32 contained in the connector block. In addition, the movement of the platform and the platform pins toward their second position relative to the tool base housing 62 will cause the connector block distal end surface 18' to come into engagement with the plunger engagement surface 110 of the spring plunger. The movement of the platform 70 and the connector block 52 toward the second position of the platform will compress the spring 112 of the spring plunger to a certain extent, but the force of the spring and the engagement of the plunger engagement surface 110 with the distal end surface 18' of the connector block 52 will stop further movement of the connector block with the platform 70. Continued movement of the platform 70 and the platform pins 136 toward the second position of the platform with the connector block 52 now held stationary by the spring plunger abutment 108 causes the platform pins 136 to push each electric terminal 32 toward the distal end surface 18' of the connector block 52 and toward the locking protrusions in the interior channels 22' of the connector block. This ensures that the electric terminal locking tabs 46 come into engagement with the protrusions in the interior channels 22' of the connector block 52, thereby securing each terminal in the connector block. The movement of the connector block 52 by the platform 70 also moves each of the electric terminals 32 of the connector block into engagement with one of the surge tester bars 116 where the wiring of the electric motor can be tested for proper operation by the surge tester (not shown).

With the locking of the electric terminals 32 in the connector block 52 and the surge testing of the motor completed, the actuator 72 is operated to move the platform 70 from its second position shown in FIGS. 17, 19 and 21, toward its first position shown in FIGS. 16, 18 and 20. This disengages the surge tester bars 116 from the electric terminals 32 of the connector block and positions the connector block relative to the tool 62 where the connector block can be removed from the tool by merely lifting the connector block from the platform 70 and the platform pins 136.

Thus the connector block and the tooling of the invention and the method of operating the tooling ensure that the electric terminals of the motor wiring are securely locked in the connector block while simultaneously providing surge testing of the motor wiring.

While the present invention and its method of operation have been described above by reference to a specific embodiment, it should be understood that variations and modifications of the invention may be derived without departing from the scope of the invention defined by the following claims.

What is claimed is:

1. An apparatus for connecting electric terminals to connector blocks, the apparatus comprising:

a tool having a base with a receptacle that is dimensioned to receive a connector block and maintain the connector block in a first orientation relative to the base where a length of the connector block is oriented in a first direction relative to the base;

a plurality of pins mounted on the base and a plurality of first engagement surfaces on the plurality of pins with each pin of the plurality of pins having a length and having a first engagement surface of the plurality of first engagement surfaces, the plurality of pins being positioned on the base where the length of each pin traverses the first direction and where the first engagement surfaces of the pins will each engage with an electric terminal of a connector block having a plurality of electric terminals that is received by the base receptacle;

a second engagement surface positioned on the base where the second engagement surface will engage with the connector block when the connector block is received by the receptacle; and, an actuator on the base that is operatively connected to the plurality of pins and the second engagement surface, the actuator having means for moving at least one of the plurality of pins and second engagement surface relative to the other of the plurality of pins and second engagement surface and thereby cause relative movement between the plurality of electric terminals and the connector block that connects the plurality of electric terminals to the connector block.

2. The apparatus of claim 1, further comprising:

an electrical contact positioned on the base where the electrical contact will engage and establish an electrically conductive connection with the plurality of electric terminals of the connector block when the connector block is received by the receptacle of the base.

3. The apparatus of claim 2, further comprising:

the electrical contact being mounted stationary on the base.

4. The apparatus of claim 1, further comprising:

the actuator being operatively connected to the plurality of pins and the second engagement surface for moving at least one of the plurality of pins and second engagement in the first direction relative to the other of the plurality of pins and second engagement surface.

5. The apparatus of claim 1, further comprising:

the actuator being operatively connected to the plurality of pins for moving the plurality of pins and the second engagement surface relative to the other of the plurality of pins and the second engagement surface.

6. The apparatus of claim 1, further comprising:

the actuator being operatively connected to the plurality of pins for moving the plurality of pins simultaneously toward and away from the second engagement surface and thereby cause simultaneous movement of the plurality of electric terminals of the connector block received by the base receptacle connecting the plurality of electric terminals with the connector block.

7. The apparatus of claim 6, further comprising:

a plurality of electrical contacts positioned on the base where each of the plurality of electrical contacts will engage and establish an electrically conductive connection with one of the plurality of electric terminals of the connector block when the actuator moves the connector block toward the second engagement surface.

8. The apparatus of claim 1, further comprising:

the plurality of pins being moveable on the base between first and second positions of the plurality of pins relative to the base where in the first position the plurality of pins are spaced a first distance from the second engagement surface and in the second position the plurality of pins are spaced a second distance from the second engagement surface that is smaller than the first distance, and where movement of the plurality of pins on the base from the first position to the second position when a connector block is received by the base receptacle causes the plurality of pins to move the connector block into engagement with the second engagement surface and causes relative movement between the electric terminals and the connector block that connects the electric terminals to the connector block.

9. The apparatus of claim 8, further comprising:

the second engagement surface being mounted on the base for adjusting movement of the second engagement surface toward and away from the first position of the plurality of pins.

10. The apparatus of claim 8, further comprising:

the actuator on the base being operatively connected to the second engagement surface and the plurality of pins for moving the plurality of pins between the first position and the second position of the plurality of pins relative to the base on operation of the actuator.

11. The apparatus of claim 8, further comprising:

the plurality of pins being simultaneously moveable on the base along the first line of movement toward the second engagement surface when a connector block is received by the base to cause the connector block to engage with the second engagement surface and cause relative movement between the plurality of electric terminals and the connector block that connects the plurality of electric terminals to the connector block.

12. The apparatus of claim 8, further comprising:

a plurality of electric contacts on the base in positions where the electric contacts will engage with and establish an electrically conductive connection with the plurality of electric terminals on a connector block received by the base when the plurality of pins are moved along the first line of movement toward the second engagement surface.

13. The apparatus of claim 8, further comprising:

a platform mounted on the base for reciprocating movement of the platform along a first line of movement toward and away from the second engagement surface; and, the plurality of pins being mounted on the platform for movement of the plurality of pins with the platform.

14. The apparatus of claim 13, further comprising:

the plurality of pins being mounted on the platform for reciprocating movement of the plurality of pins with the platform along the first line of movement toward and away from the second engagement surface, the plurality of pins being arranged in a pattern on the platform that matches a pattern of electric terminals on the connector block enabling the plurality of pins on the platform to engage with the plurality of electric terminals on a connector block received by the base.

15. The apparatus of claim 14, further comprising:

the plurality of pins being simultaneously moveable with the platform along the first line of movement toward the second engagement surface when a connector block is received by the base to cause the connector block to engage with the second engagement surface and cause relative movement between the plurality of electric terminals and the connector block that connects the plurality of electric terminals to the connector block.

16. The apparatus of claim 14, further comprising:

a plurality of electric contacts on the base in positions where the electric contacts will engage with and establish an electrically conductive connection with the plurality of electric terminals on a connector block received by the base when the plurality of pins and the platform are moved along the first line of movement toward the second engagement surface.

17. The apparatus of claim 1, further comprising:

an electric contact on the base; and, the plurality of pins being moveable on the base between first and second positions of the plurality of pins relative to the base where in the first position the plurality of pins are displaced from the electric contact and in the second position the plurality of pins are adjacent the electric contact, and where movement of the plurality of pins on the base from the first position to the second position when a connector block is received by the base receptacle causes the plurality of pins to move the electric terminals of the connector block into electrically conductive engagement with the electric contact, and movement of the plurality of pins on the base from the second position to the first position when a connector block is received by the base receptacle causes the plurality of pins to move the electric terminals of the connector block out of electrically conductive engagement with the electric contact.

18. The apparatus of claim 17, further comprising:

the actuator on the base being operatively connected to the base and the plurality of pins for moving the plurality of pins between the first position and the second position of the plurality of pins relative to the base on operation of the actuator.

19. The apparatus of claim 17, further comprising:

the plurality of pins being mounted on the base for simultaneous reciprocating movement of the plurality of pins along a first line of movement toward and away from the electric contact, the plurality of pins being arranged in a pattern that matches a pattern of the plurality of electric terminals on the connector block enabling the plurality of pins to engage with the plurality of electric terminals on the connector block received by the base and move the plurality of electric terminals and the connector block simultaneously along the first line of movement toward and away from the electric contact.

20. The apparatus of claim 19, further comprising:

the electric contact being one of a plurality of electric contacts positioned on the base where the electric contacts will engage with and establish an electrically conductive connection with the plurality of electric terminals on a connector block received by the base when the plurality of pins are moved along the first line of movement to the second position.

21. The apparatus of claim 17, further comprising:

a platform mounted on the base for reciprocating movement of the platform along a first line of movement toward and away from the electric contact; and, the plurality of pins being mounted on the platform for movement of the plurality of pins with the platform.

22. The apparatus of claim 21, further comprising:

the plurality of pins being mounted on the platform for simultaneous reciprocating movement of the plurality of pins with the platform along the first line of movement toward and away from the electric contact, the plurality of pins being arranged in a pattern on the platform that matches a pattern of the electric terminals on the connector block enabling the plurality of pins on the platform to engage with the plurality of electric terminals on the connector block received by the base.

23. The apparatus of claim 22, further comprising:

the electric contact being one of a plurality of electric contacts on the base positioned to engage with and establish an electrically conductive connection with the plurality of electric terminals on a connector block received by the base when the plurality of pins and the platform are moved along the first line of movement from the first position to the second position.

* * * * *